(12) United States Patent
Wu

(10) Patent No.: US 9,908,185 B1
(45) Date of Patent: Mar. 6, 2018

(54) CUTTING DEVICE WITH WHEELED BLADES

(71) Applicant: JIIN HAUR INDUSTRIAL CO., LTD., Lu Kang Town, Chang Hua Hsien (TW)

(72) Inventor: Shih-Piao Wu, Lu Kang Town (TW)

(73) Assignee: JIIN HAUR INDUSTRIAL CO., LTD., Changhua County (TW)

( * ) Notice: Subject to any disclaimer, the term of this patent is extended or adjusted under 35 U.S.C. 154(b) by 0 days.

(21) Appl. No.: 15/358,113

(22) Filed: Nov. 21, 2016

(51) Int. Cl.
| | |
|---|---|
| *B23D 21/08* | (2006.01) |
| *B26B 25/00* | (2006.01) |
| *A01G 3/08* | (2006.01) |
| *B26D 3/16* | (2006.01) |

(52) U.S. Cl.
CPC ............ *B23D 21/08* (2013.01); *A01G 3/081* (2013.01); *B26B 25/005* (2013.01); *B26D 3/169* (2013.01)

(58) Field of Classification Search
CPC ...... B23D 21/06; B23D 21/08; B26B 25/005; A01G 3/081; B26D 3/169
USPC ....... 30/93–96, 98, 101, 102, 263, 265, 306, 30/307; D8/60
See application file for complete search history.

(56) References Cited

U.S. PATENT DOCUMENTS

| | | | | | |
|---|---|---|---|---|---|
| 164,327 | A | * | 6/1875 | Pleas ................... | B26B 13/24 30/265 |
| 176,815 | A | * | 5/1876 | Saunders ............. | B23D 21/10 30/94 |
| 255,102 | A | * | 3/1882 | Danheim ............. | B26B 25/00 30/265 |
| 338,716 | A | * | 3/1886 | Conner ................. | B23D 21/08 30/102 |
| 445,700 | A | * | 2/1891 | Lachaume et al. .... | B26B 25/00 30/265 |
| 480,878 | A | * | 8/1892 | Rounds ................ | B26B 25/00 30/263 |
| 500,443 | A | * | 6/1893 | Tyler ................... | B23D 21/08 30/101 |
| 524,400 | A | * | 8/1894 | Rinman ............... | B21D 1/06 30/102 |

(Continued)

FOREIGN PATENT DOCUMENTS

| | | | | |
|---|---|---|---|---|
| DE | 29604474 U1 | * | 6/1996 | ............ B23D 21/08 |
| DE | 202016105452 U1 | * | 10/2016 | ............ B23D 21/08 |

(Continued)

*Primary Examiner* — Jason Daniel Prone

(57) ABSTRACT

A cutting device with wheeled blades has a shear and a cutting wheel set-blade. The shear has a first handle and a second handle pivoted together via a pivot member, the first handle extending to form a first arm, and the first arm provided with a connecting aperture, and the second handle extending to form a second arm, an assembling aperture provided at an end of the second arm. The cutting wheel set-blade having two positioning wheeled-blades, a third arm and a movable wheeled blade. The positioning wheeled-blades are respectively connected to the connecting aperture and the assembling aperture of the shear, the third arm lockable with the adjustment apertures of the shear via a knob, a locking aperture provided on the extended third arm and engaging the movable wheel-blade, and the two positioning wheeled-blades and the movable wheeled blade are disposed in a triangular arrangement on the shear.

6 Claims, 9 Drawing Sheets

(56) References Cited

U.S. PATENT DOCUMENTS

| | | | | |
|---|---|---|---|---|
| 589,101 | A * | 8/1897 | Scholes | B23D 21/10 30/101 |
| 647,685 | A * | 4/1900 | Stewart | E21B 19/161 30/101 |
| 734,304 | A * | 7/1903 | Crecelius | B23D 29/023 30/263 |
| 769,081 | A * | 8/1904 | Hemington | B26B 25/00 30/265 |
| 771,281 | A * | 10/1904 | Smith | B27G 19/02 30/265 |
| 785,225 | A * | 3/1905 | Manly | B23D 29/023 30/263 |
| 805,927 | A * | 11/1905 | Minck | B25B 13/14 30/102 |
| 812,210 | A * | 2/1906 | Kovacs | B23D 21/10 30/94 |
| 860,711 | A * | 7/1907 | Booth | B23D 21/10 30/94 |
| 862,049 | A * | 7/1907 | Vosper | B23D 21/08 30/102 |
| 890,327 | A * | 6/1908 | Blum | B25B 7/02 30/102 |
| 951,367 | A * | 3/1910 | Ducharme | B25B 13/12 30/102 |
| 999,668 | A * | 8/1911 | Montaperto | B23D 21/08 30/102 |
| 1,034,345 | A * | 7/1912 | Compton | B23D 21/08 30/101 |
| 1,229,120 | A * | 6/1917 | Montgomery | B26B 25/00 30/265 |
| 1,330,476 | A * | 2/1920 | Klug | B23D 21/08 30/102 |
| 1,482,206 | A * | 1/1924 | Tuley | C03B 33/14 30/102 |
| 1,488,832 | A * | 4/1924 | Rauth | B26B 25/005 30/263 |
| 1,841,251 | A * | 1/1932 | Miller | H02G 1/1224 30/102 |
| 1,854,389 | A * | 4/1932 | Arndt | B23D 21/08 30/102 |
| 1,969,168 | A * | 8/1934 | Edelmann | B23D 21/08 30/102 |
| 2,007,122 | A * | 7/1935 | Briegel | B23D 21/08 30/102 |
| 2,174,222 | A * | 9/1939 | Florian | B26B 25/005 30/263 |
| 2,230,030 | A * | 1/1941 | Finch | B23D 21/08 30/102 |
| 2,285,249 | A * | 6/1942 | Barentzen | D06H 7/24 30/265 |
| 2,410,901 | A * | 11/1946 | Ramsey | B67B 7/92 30/102 |
| 2,502,700 | A * | 4/1950 | Capewell | B23D 21/08 30/102 |
| 2,502,701 | A * | 4/1950 | Capewell | B23D 21/08 30/102 |
| 2,515,627 | A * | 7/1950 | Capewell | B23D 21/08 30/102 |
| 2,518,074 | A * | 8/1950 | Sauter | H02G 1/1297 30/96 |
| 2,527,082 | A * | 10/1950 | Salas | C14B 5/00 30/263 |
| 2,578,346 | A * | 12/1951 | Florian et al. | C14B 5/00 30/265 |
| 2,655,763 | A * | 10/1953 | Grissett | A01G 23/099 30/102 |
| 2,725,774 | A * | 12/1955 | Tekse | B23D 21/08 30/102 |
| 2,734,267 | A * | 2/1956 | Palmer | B23D 21/08 30/102 |
| D181,210 | S * | 10/1957 | Lindley et al. | D8/60 |
| 2,817,898 | A * | 12/1957 | Vermette | B23D 21/08 30/102 |
| 3,025,597 | A * | 3/1962 | Huglin | B23D 21/08 30/102 |
| 3,118,227 | A * | 1/1964 | Samuels et al. | B23D 21/08 30/102 |
| 3,216,110 | A * | 11/1965 | Stallings | H02G 1/1229 30/102 |
| 3,243,878 | A * | 4/1966 | Bjalme et al. | B23D 21/10 30/100 |
| 4,080,733 | A * | 3/1978 | Clegg | B23D 29/023 30/102 |
| 4,103,419 | A * | 8/1978 | Matthews | B23D 21/10 30/95 |
| 4,847,997 | A * | 7/1989 | Petty | B23D 21/08 30/102 |
| 4,858,316 | A * | 8/1989 | Dubey | B23D 21/08 30/102 |
| 5,033,153 | A * | 7/1991 | Post | B23D 21/08 30/102 |
| 5,206,996 | A * | 5/1993 | McDaniel | B23D 21/08 30/101 |
| 5,230,150 | A * | 7/1993 | Sperti | B23D 21/08 30/101 |
| 5,475,924 | A * | 12/1995 | McDaniel | B23D 21/08 30/102 |
| 5,581,886 | A * | 12/1996 | Sesser | B23D 21/08 30/101 |
| 5,903,980 | A * | 5/1999 | Collier | B23D 21/08 30/101 |
| 6,237,449 | B1 * | 5/2001 | Orlosky | B25B 13/5058 30/101 |
| 6,810,587 | B1 * | 11/2004 | Robertson | B26D 3/169 30/101 |
| 7,246,443 | B2 * | 7/2007 | Stravitz | B26B 25/005 30/102 |
| 7,275,320 | B2 * | 10/2007 | Lee | B23D 21/06 30/101 |
| 2008/0060203 | A1 * | 3/2008 | Metcalf | B23D 21/08 30/101 |

FOREIGN PATENT DOCUMENTS

| | | | | |
|---|---|---|---|---|
| EP | 0730933 A1 * | 9/1996 | | B23D 21/08 |
| EP | 1433577 A1 * | 6/2004 | | B23D 21/08 |
| FR | 775897 A * | 1/1935 | | B23D 21/08 |
| FR | 2094461 A5 * | 2/1972 | | B23D 21/08 |
| GB | 118443 A * | 8/1918 | | B23D 21/08 |
| GB | 643117 A * | 9/1950 | | B23D 21/08 |
| GB | 1275909 A * | 6/1972 | | B23D 21/08 |
| GB | 2540289 A * | 1/2017 | | B23D 21/08 |
| WO | WO 8900904 A1 * | 2/1989 | | B23D 21/08 |

* cited by examiner

CUTTING DEVICE WITH WHEELED BLADES

BACKGROUND OF THE INVENTION

1. Field of Invention

The present invention relates to a cutting device, and more particularly to a shear with wheeled blades.

2. Description of Related Art

Typical rotatory cutter is usually in large size and too heavy for single handheld operation and carry. Also for each cutting process, the cutter need to be reset, which causes trouble and inconvenience. For simple soft material (such as plastic thin tube, rubber tube, paper tube or tree branches), the inconvenience of the cutter will not be as good as the use of scissors or knives, but cutting edge created by the scissors or knives is not as smooth.

Therefore, it is desirable to provide a shear with wheeled blades to mitigate and/or obviate the aforementioned problems.

SUMMARY OF THE INVENTION

An objective of present invention is to provide a shear with wheeled blades which is capable of performing rotatory cutting.

In order to achieve the above mentioned objective, a cutting device with wheeled blades has a shear and a cutting wheel set-blade. The shear has a first handle and a second handle pivoted together via a pivot member, the first handle extending to form a first arm, and the first arm provided with a connecting aperture, and the second handle extending to form a second arm, an assembling aperture provided at an end of the second arm. A distance between the assembling aperture to the pivoting member is longer than a distance between the connecting aperture to the pivoting member, and a plurality of adjustment apertures are provided between the assembling aperture and the pivoting member on the second arm. The cutting wheel set-blade comprising two positioning wheeled-blades, a third arm and a movable wheeled blade. The positioning wheeled-blades are respectively connected to the connecting aperture and the assembling aperture of the shear, the third arm lockable with the adjustment apertures of the shear via a knob, a locking aperture provided on the extended third arm and engaging the movable wheel-blade, and the two positioning wheeled-blades and the movable wheeled blade are disposed in a triangular arrangement on the shear, the movable wheeled blade capable of being assembled at different adjustment apertures through the third arm.

Other objects, advantages, and novel features of invention will become more apparent from the following detailed description when taken in conjunction with the accompanying drawings.

DETAILED DESCRIPTION OF THE PREFERRED EMBODIMENT

Figure 1:
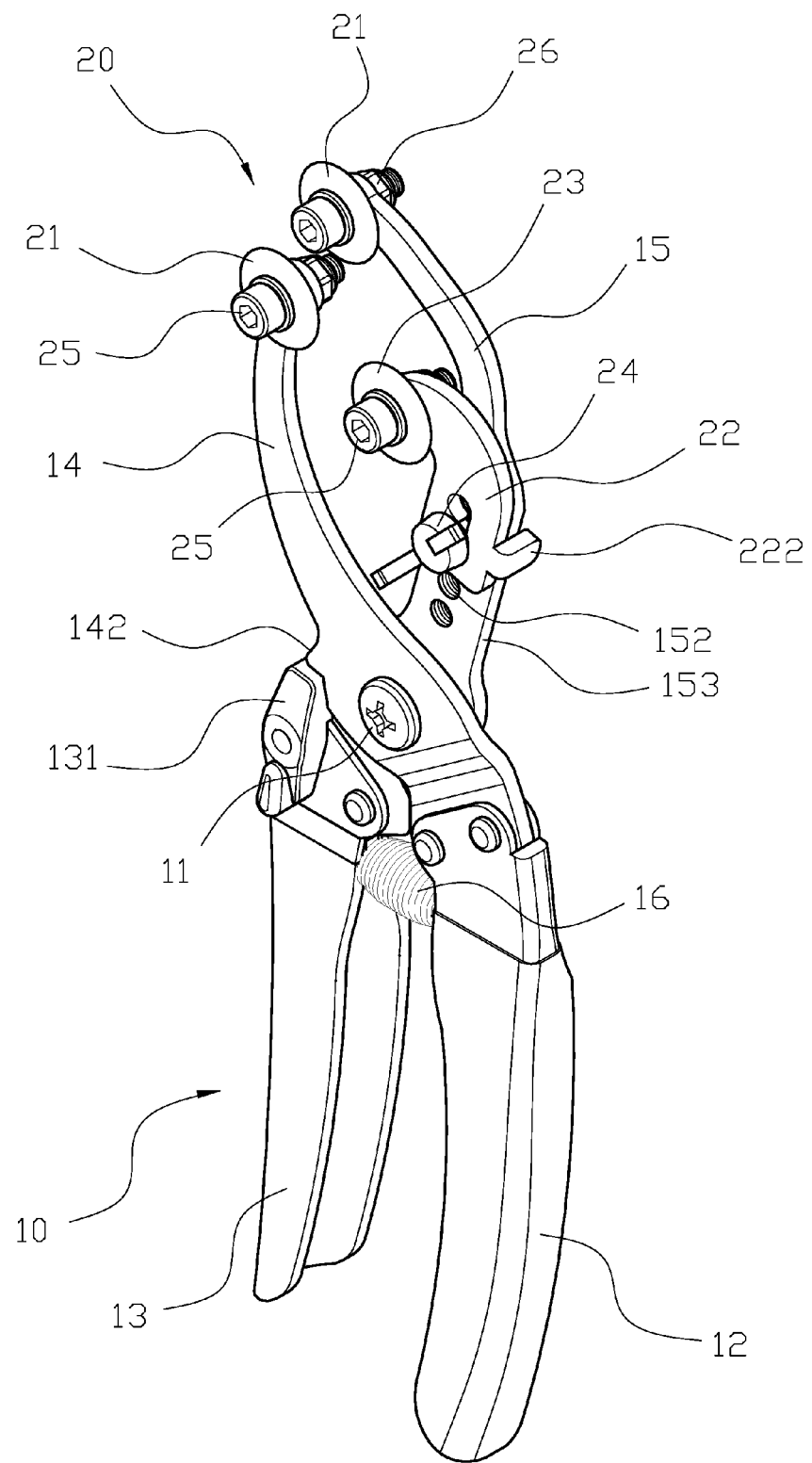
FIG. 1 is a perspective drawing of a preferred embodiment according to the prevent invention.

Please refer to FIG. 1 to FIG. 4. A cutting device with wheeled blades comprises a shear 10 and a cutting wheel set-blade 20. The shear 10 has a first handle 12 and a second handle 13 pivoted together via a pivot member 11. The first handle 12 extends to form a first arm 14, and the first arm 14 is provided with a connecting aperture 141. The second handle 13 extends to form a second arm 15, and an assembling aperture 151 is provided at an end of the second arm 15. A distance between the assembling aperture 151 to the pivoting member 11 is longer than a distance between the connecting aperture 141 to the pivoting member 11. Furthermore, a plurality of adjustment apertures 152 are provided between the assembling aperture 151 and the pivoting member 11 on the second arm 15. A contact surface 153 is provided on the second arm 15 adjacent to the adjusting apertures 152, and an elastic member 16 is sandwiched between the first handle 12 and the second handle 13. The first arm 14 is further provided with a protrusion 142 adjacent to the pivoting member 11, and the second handle 13 is further provided with an extended end 131 adjacent to the pivoting member 11 and configured to push the protrusion 142 of the first arm 14. The cutting wheel set-blade 20 comprises two positioning wheeled-blades 21, a third arm 22 and a movable wheeled blade 23. The positioning wheeled-blades 21 are respectively connected to the connecting aperture 141 and the assembling aperture 151 of the shear 10, and the third arm 22 is lockable with the adjustment apertures 152 of the shear 10 via a knob 24. A locking aperture 221 is provided on the extended third arm 22 and engages the movable wheel-blade 23, and the two positioning wheeled-blades 21 and the movable wheeled blade 23 are disposed in a triangular arrangement on the shear 10. A stopping protrusion 222 is provided on the third arm 22, the knob 24 is disposed between the movable wheeled blade 23 and the stopping protrusion 222, and the stopping protrusion 222 presses against the contact surface 153 of the second arm 15. The third arm 22 is further provided with through apertures with a plurality of continuous notches 223 for increasing a moving range of the third arm 22. Each of the connecting aperture 141 and the assembling aperture 151 of the shear 10 and the locking aperture 221 of the third arm 22 have an inner thread and respectively engage with corresponding screws 25 and nuts 26 to connect to the positioning wheeled-blade 21 and the movable wheeled blade 23. The movable wheeled blade 23 is capable of being assembled at different adjustment apertures 152 through the third arm 22, to match different sizes rods A1 (as shown in FIG. 6).

Figure 2:
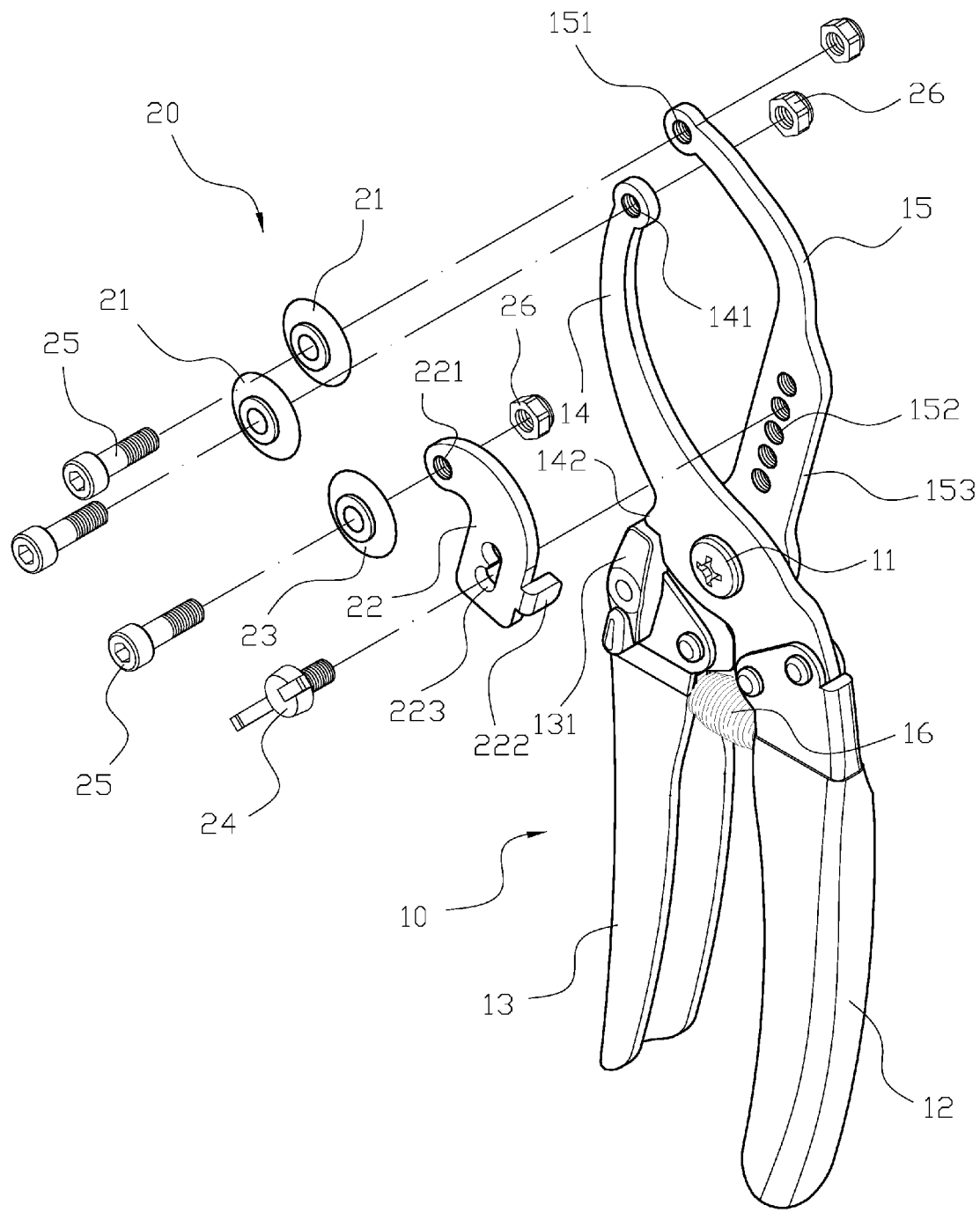
FIG. 2 is an exploded view of the preferred embodiment according to the prevent invention.
Figure 3:
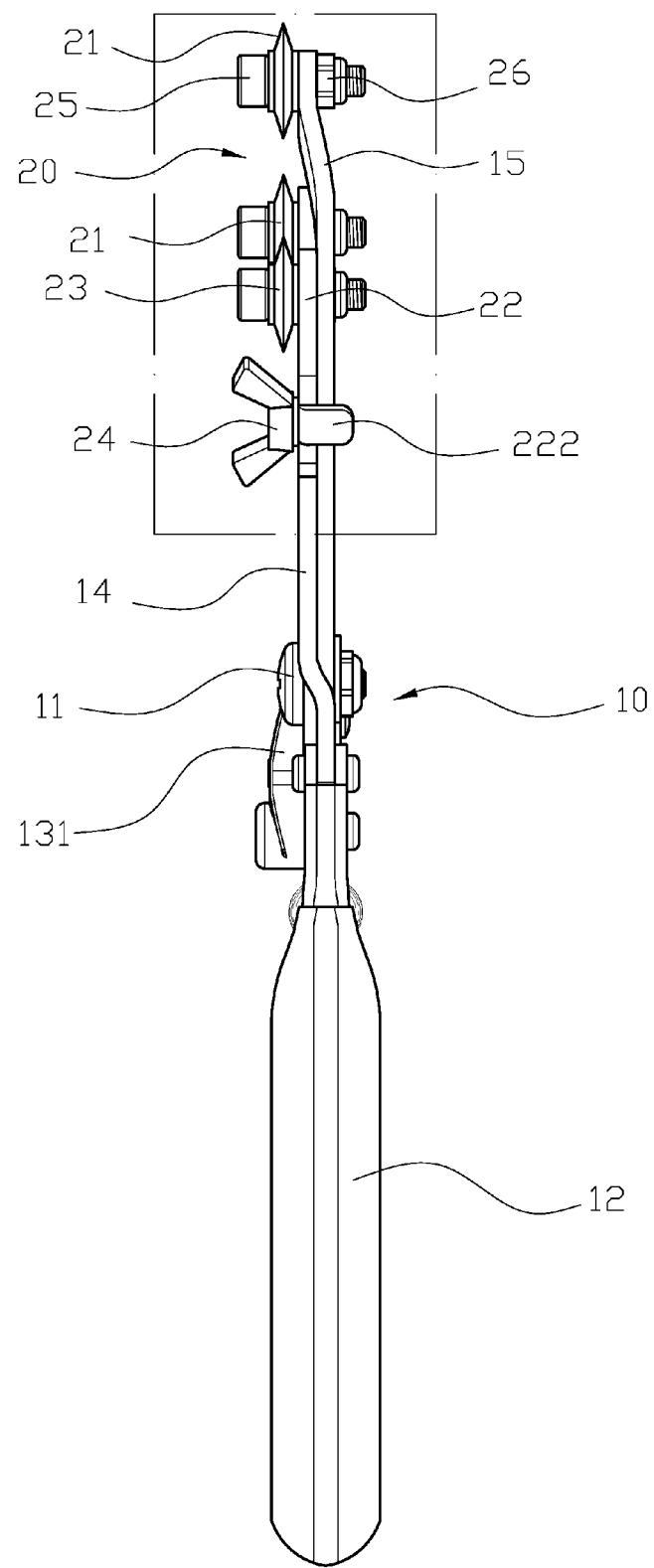
FIG. 3 is a side view of the preferred embodiment according to the prevent invention.
Figure 4:
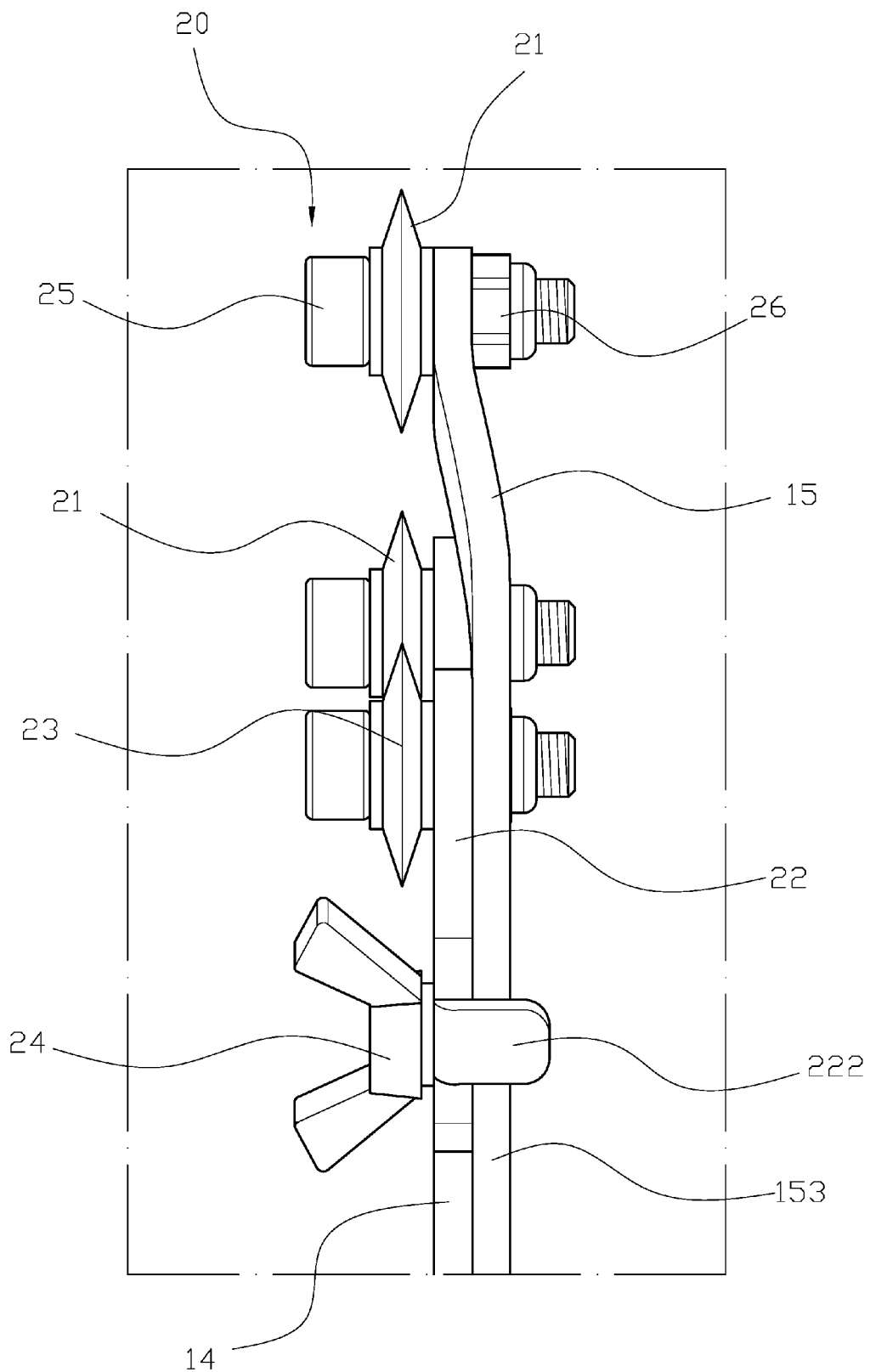
FIG. 4 is a local detail drawing of FIG. 3.
Figure 5:
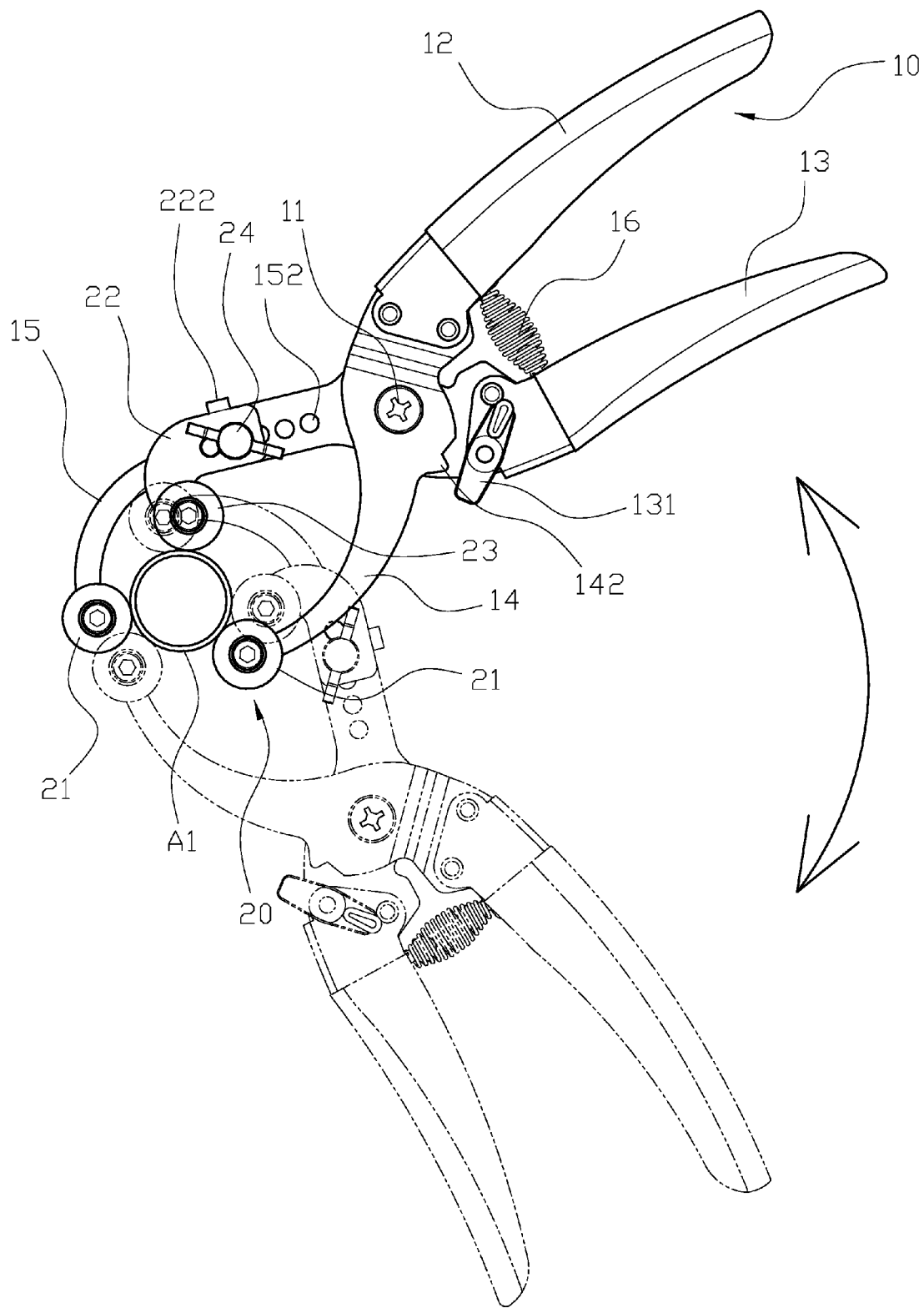
FIG. 5 is a schematic drawing of actual usage of the preferred embodiment according to the prevent invention.
Figure 6:
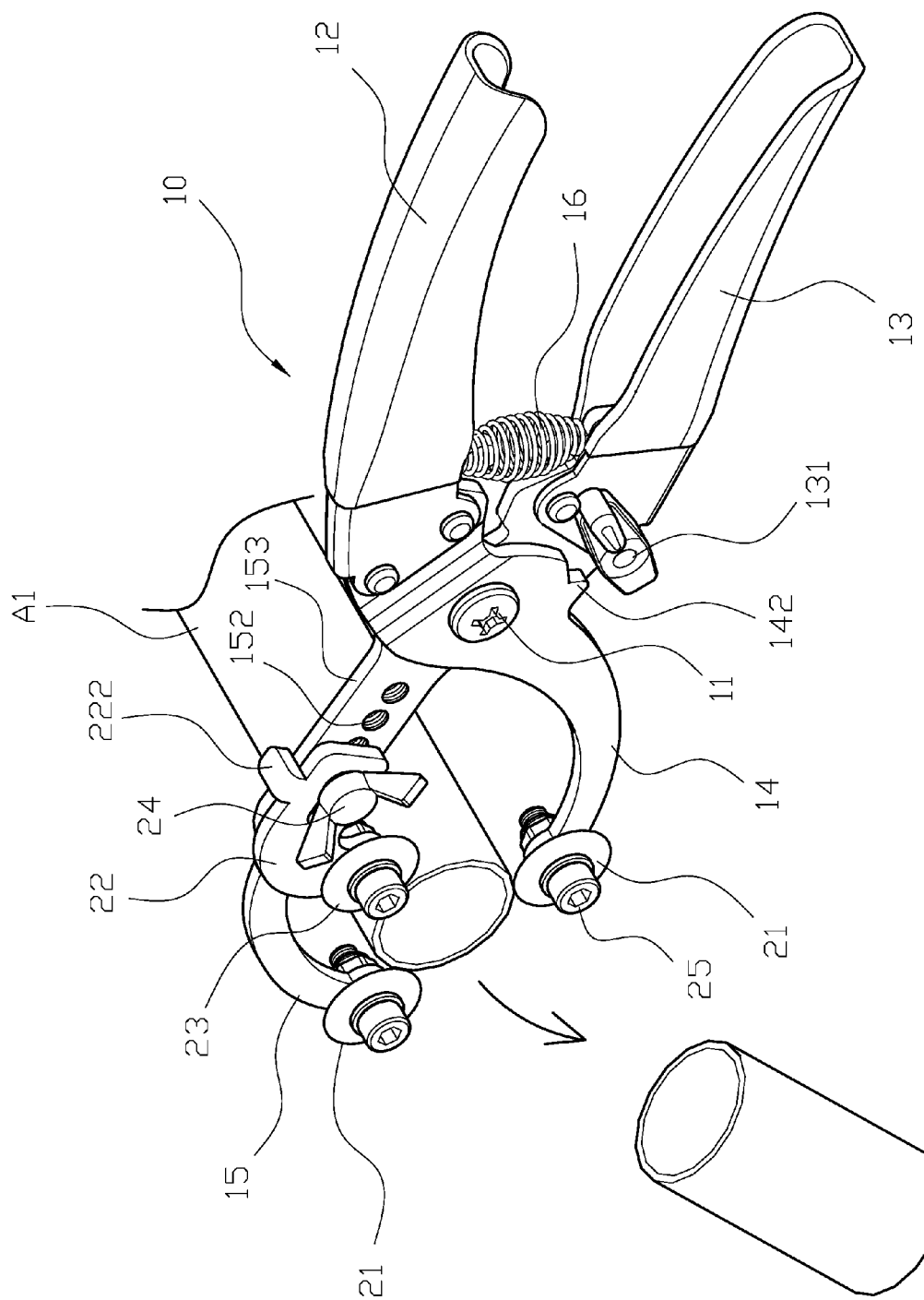
FIG. 6 is another schematic drawing of an actual operation of the preferred embodiment according to the prevent invention.
Figure 7:
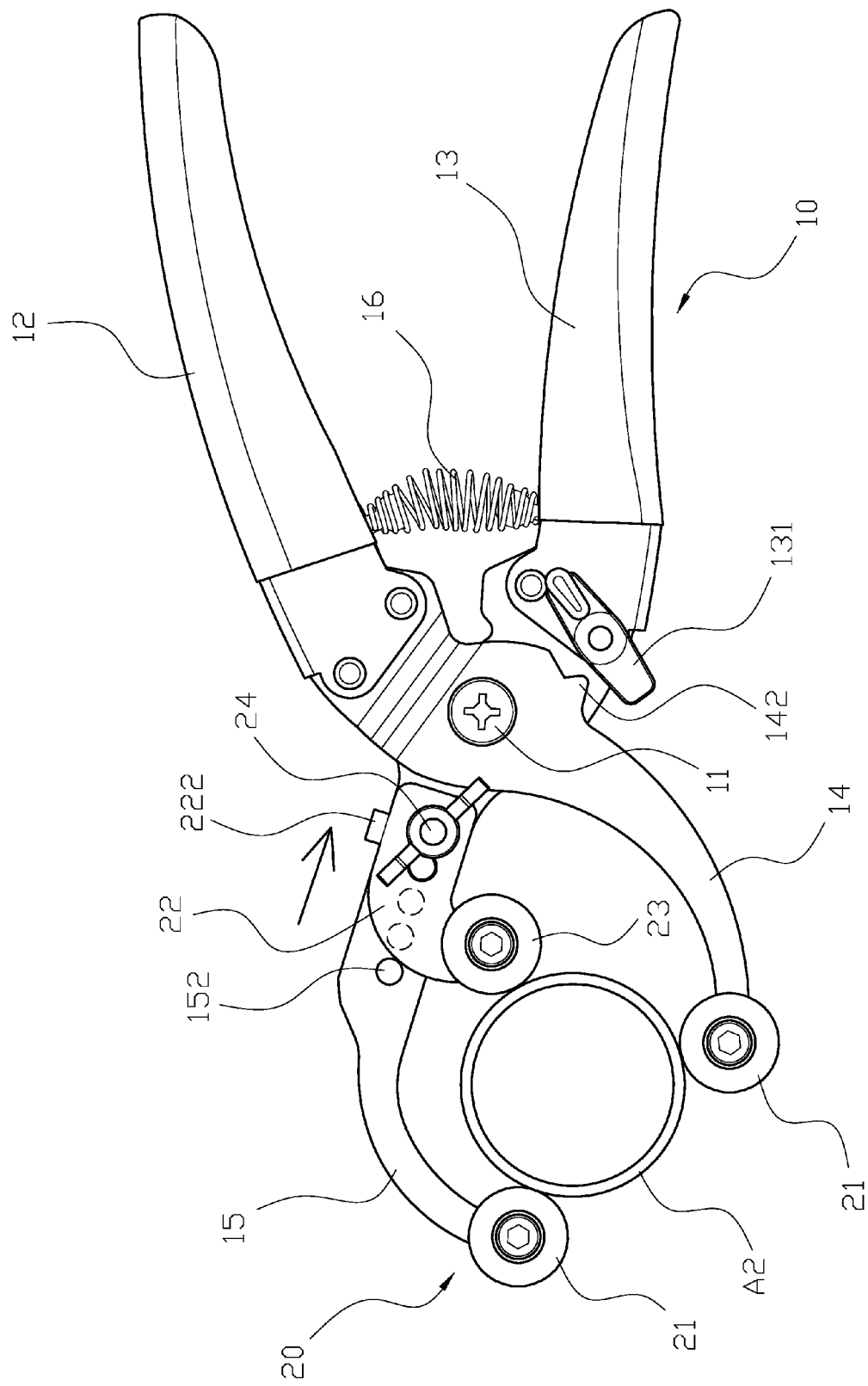
FIG. 7 is a schematic drawing of another actual operation of the preferred embodiment according to the prevent invention.
Figure 8:
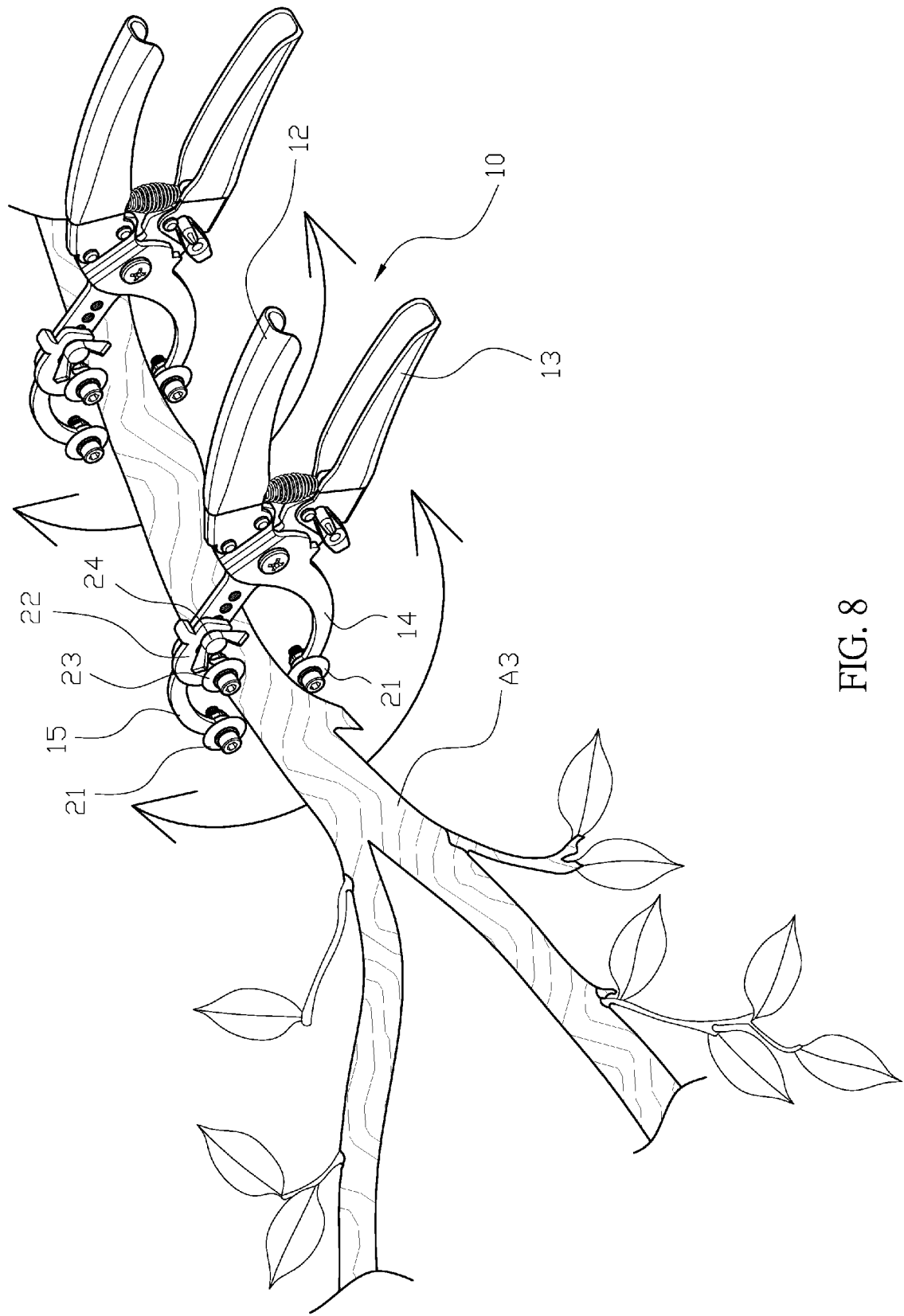
FIG. 8 is a schematic drawing of another actual operation of the preferred embodiment according to the prevent invention.
Figure 9:
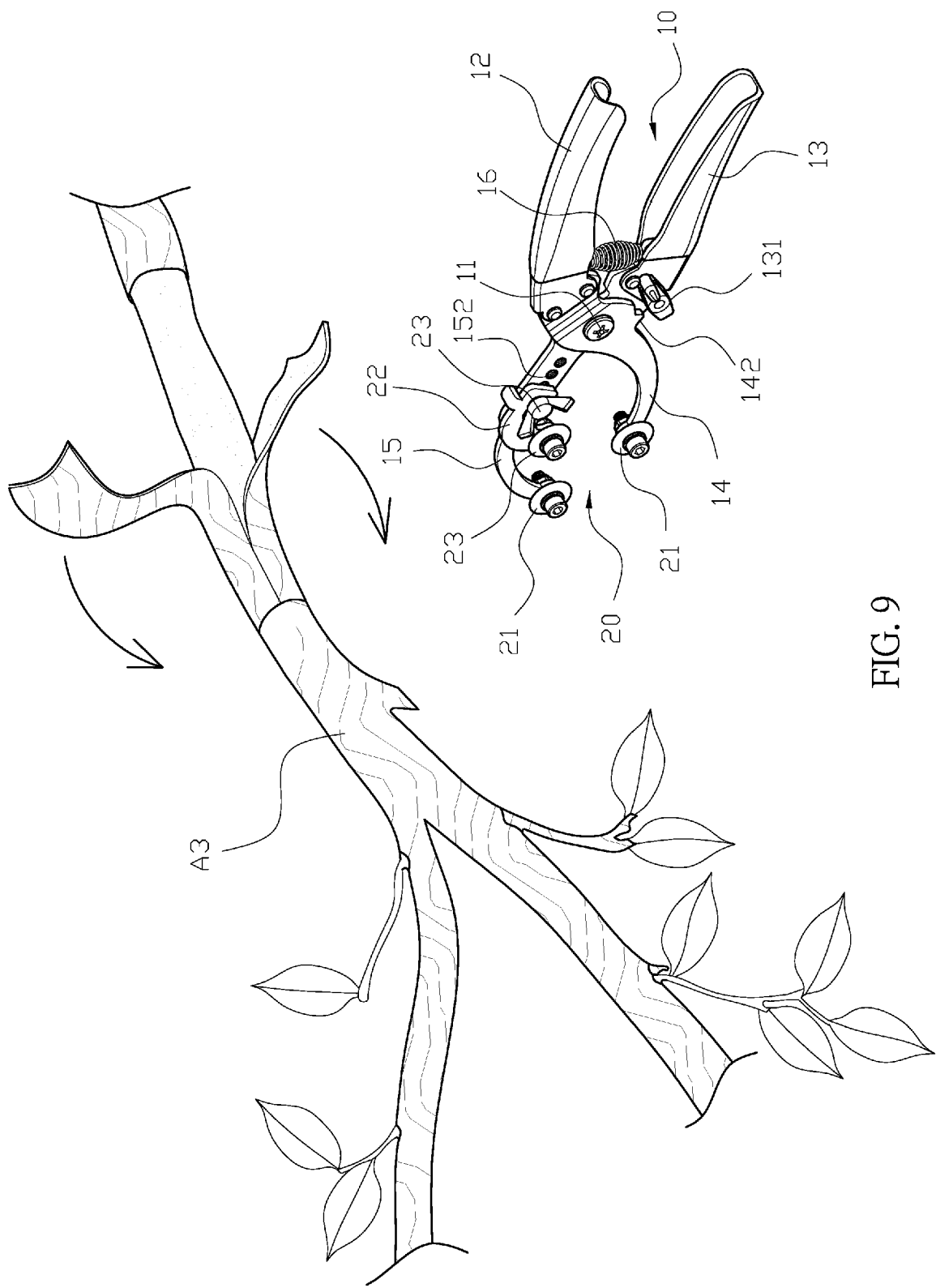
FIG. 9 is another schematic drawing of another actual operation shown in FIG. 8 of the preferred embodiment according to the prevent invention.

The actual use of the shear, please refer to FIGS. 5,6 with FIG. 2, the shear 10 uses the pivoting member 11 to join the first handle 12 and the second handle 13 together, such that the shear 10 symmetrical extends with the first arm 14 and the second arm 15. The positioning wheeled-blade 21 of the cutting blade set 20 is installed with the connecting aperture 141 of the first arm 14 and the assembling aperture 151 of the second arm 15, and the second arm 15 is engaged with the through aperture 223 of the third arm 22 at the adjusting aperture 152 via the knob 24. The stopping protrusion 222 of the third arm 22 presses against the contact surface 153 of the second arm 15, and the movable wheeled blade 23 is connected to the locking aperture 221 of the third arm 22 via the bolt 25 and the nut 26. Therefore, by opening the first arm 14 and the second arm 15 of the shear 10, the positioning wheeled-blade 21 of the cutting blade set 20 is capable of being placed across the rod A1, then by pressing the first handle 12 and the second handle 13 together to cause the shear 10 to rotate around the pivoting member 11 and bring the first wheel 14 and the second arm 15 into contact with each other. Meanwhile, the positioning wheeled-blades 21 and the movable wheeled blade 23 mutually sandwich the rod A1, with the rotation of the positioning wheeled-blade 21 and the movable wheeled blade 23, the shear 10 can gradually increase the cutting depth in accordance with the rotation action, thereby producing a cutting effect on the rod A1. When it is necessary to cut a thick rod A2, as shown in FIG. 7, the user can loosen the knob 24 to move to the adjustment aperture 152 closer to the pivoting member 11 to enlarge a gap between the movable wheeled blade 23 and the positioning wheeled-blade 21. And the through apertures 223 of the third arm 22 also provide different options for the knob 24, through different combinations between the adjustment apertures 152 and the through apertures 223, the displacement range of the third arm 22 can be increased. Please see the FIGS. 8 and 9, a rod A3 can be a branch, by using the cutting blade set 20 of the shear 10 to clamp rod A3 (branches) for cutting rotation, which can cut and remove bark from branch to protect the trunk during winter time.

With the structure described in the above mentioned embodiment, the following benefits are obtained: (1) The shear 10 is capable of performing a various cutting range to rods with different sizes and being used as an easy-to-carry portable tool (2) The shear 10 is provided with rotary peeling effect for different rod diameters.

Although the present invention has been explained in relation to its preferred embodiment, it is to be understood that many other possible modifications and variations can be made without departing from the spirit and scope of invention as hereinafter claimed.

What is claimed is:

1. A cutting device comprising:
a shear having a first handle and a second handle pivoted together via a pivot member, the first handle extending to form a first arm, and the first arm provided with a connecting aperture, and the second handle extending to form a second arm, an assembling aperture provided at an end of the second arm, wherein a distance between the assembling aperture to the pivoting member is longer than a distance between the connecting aperture to the pivoting member, and a plurality of adjustment apertures are provided between the assembling aperture and the pivoting member on the second arm; and
a cutting wheel set-blade comprising two positioning wheeled-blades, a third arm and a movable wheeled blade;
wherein the positioning wheeled-blades are respectively connected to the connecting aperture and the assembling aperture of the shear, the third arm lockable with the adjustment apertures of the shear via a knob, a locking aperture provided on the extended third arm and engaging the movable wheel-blade, and the two positioning wheeled-blades and the movable wheeled blade are disposed in a triangular arrangement on the shear, the movable wheeled blade capable of being assembled at different adjustment apertures through the third arm via the knob.

2. The cutting device as claimed in claim 1, wherein a contact surface is provided on the second arm adjacent to the adjusting apertures, a stopping protrusion is provided on the third arm, the knob disposed between the movable wheeled blade and the stopping protrusion, and the stopping protrusion presses against the contact surface of the second arm.

3. The cutting device as claimed in claim 1, wherein the third arm is further provided with a through aperture with a plurality of notches to receive the knob for increasing a moving range of the third arm.

4. The cutting device as claim in claim 1, wherein each of the connecting aperture, the assembling aperture, and the locking aperture have an inner thread and respectively engage with corresponding screws and nuts to define the respective connections of the positioning wheeled-blades with the connecting aperture and the assembling aperture and to define the engagement of the movable wheeled blade with the locking aperture.

5. The cutting device as claimed in claim 1, wherein the shear further comprises an elastic member disposed between the first handle and the second handle.

6. The cutting device as claimed in claim 1, wherein the first arm is further provided with a protrusion adjacent to the pivoting member, the second handle is further provided with an extended end adjacent to the pivoting member and configured to push the protrusion of the first arm.

* * * * *